(12) United States Patent
Tanaka

(10) Patent No.: US 6,275,241 B1
(45) Date of Patent: Aug. 14, 2001

(54) HIGH SPEED IMAGE DRAWING APPARATUS FOR DISPLAYING THREE DIMENSIONAL IMAGES

(75) Inventor: Hidenori Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/150,252

(22) Filed: Sep. 10, 1998

(30) Foreign Application Priority Data

Sep. 11, 1997 (JP) .................................................... 9-247073

(51) Int. Cl.[7] ........................................................ G09G 5/39
(52) U.S. Cl. .......................... 345/531; 345/422; 345/443; 345/539
(58) Field of Search ........................... 345/422, 507–509, 345/419, 521, 501, 531, 536, 539, 545, 443

(56) References Cited

U.S. PATENT DOCUMENTS

| | | | |
|---|---|---|---|
| 5,497,453 | * 3/1996 | Megahed et al. | 395/122 |
| 5,748,946 | * 5/1998 | Schneider | 345/501 |
| 5,758,045 | * 5/1998 | Moon et al. | 345/422 |
| 5,774,132 | * 6/1998 | Uchiyama | 345/503 |
| 5,982,376 | * 11/1999 | Abe et al. | 345/422 |
| 6,052,129 | * 4/2000 | Fowler et al. | 345/434 |
| 6,078,336 | * 6/2000 | Reynolds | 345/513 |

FOREIGN PATENT DOCUMENTS

| | | | |
|---|---|---|---|
| 6-89090 | 3/1994 | (JP) | G09G/5/36 |

* cited by examiner

*Primary Examiner*—Kee M. Tung
(74) *Attorney, Agent, or Firm*—Sughrue, Mion, Zinn, Macpeak & Seas, PLLC

(57) ABSTRACT

This invention is a three-dimensional image drawing apparatus that comprises a frame buffer for storing display data corresponding to a display screen in a display apparatus, and a two-dimensional drawing circuit for performing coordinate operations in order to draw specific two-dimensional images in the frame buffer. The apparatus also uses a Z buffer for storing depth data in order to perform three-dimensional drawing to the frame buffer, and a three-dimensional straight line drawing circuit for making three-dimensional drawings to the frame buffer based on the depth data stored in the Z buffer. The apparatus also uses a memory control circuit for controlling access to the buffers, and a bit number altering circuit for altering the number of bits per pixel in the coordinate operations of the two-dimensional drawing circuit either to a number of bits corresponding to the drawing data in the frame buffer or to a number of bits corresponding to the depth data in the Z buffer. The areas of both the frame buffer and Z buffer here are established in the same physical memory.

10 Claims, 14 Drawing Sheets

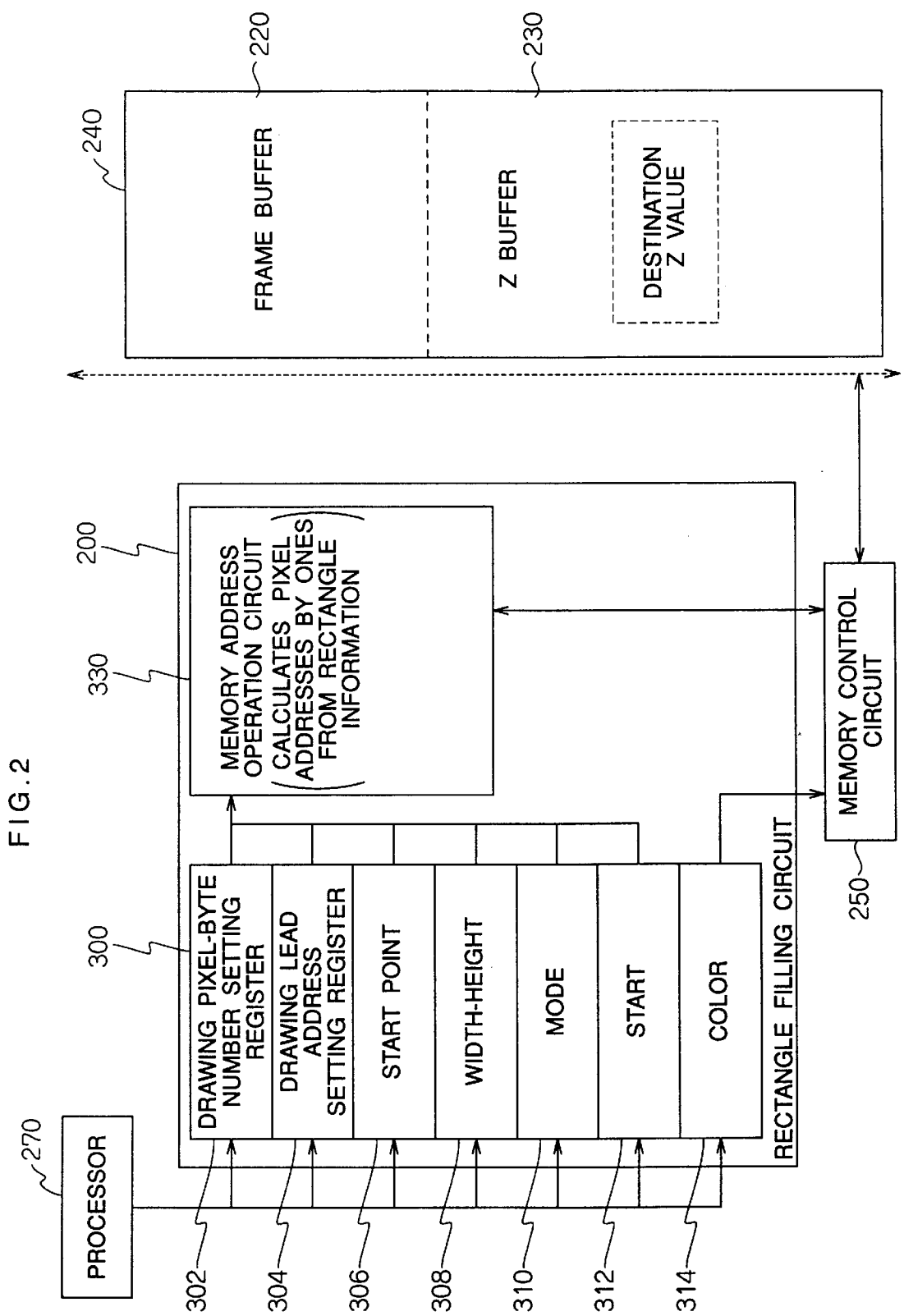

FIG. 3

SETTING REGISTERS

| MEMORY ADDRESS | REGISTER TYPE | FORMAT | |
|---|---|---|---|
| 2000000h | DRAWING LEAD ADDRESS | WHEN DRAWING TO FRAME BUFFER = FRAME BUFFER LEAD WHEN DRAWING TO Z BUFFER = Z BUFFER LEAD | |
| 2000004h | DRAWING PIXEL-BYTE NUMBER | WHEN DRAWING TO FRAME BUFFER = 1, 2, OR 4 BYTES (SAME AS DISPLAY) WHEN DRAWING TO Z BUFFER = 2 OR 4 BYTES | |
| 200000ch | RECTANGLE START POINT POSITION | Y COORDINATE | X COORDINATE |
| 2000000h | MODE | WHEN FILLING IN RECTANGLE = SET TO 1 WHEN TRANSFERRING RECTANGLE = SET TO 2 | |
| 2000014h | WIDTH-HEIGHT | HEIGHT | WIDTH |
| 2000018h | COLOR | WHEN 8 BPP = 1 BYTE, WHEN 16 BPP = 2 BYTES, WHEN 32 BPP = 4 BYTES | |
| 200001ch | START | WHEN STARTING DRAWING = SET TO 1 | |

IN MOST CASES SET TO AN INITIAL VALUE OF 0
REQUIRES LARGE VOLUME OF MEMORY ACCESSES BUT FACILITATES HIGH SPEED BY USE OF RECTANGLE FILLING CIRCUIT

VALUE CAN BE SET SIMPLY FOR ANY RECTANGLE IF RECTANGLE FILLING CIRCUIT IS USED

FIG. 5(A)

| COLOR VALUE | ALPHA (31-24) | RED (23-16) | GREEN (15-8) | BLUE (7-0) |
|---|---|---|---|---|

FIG. 5(B)

| Z VALUE | Z (31-0) |
|---|---|

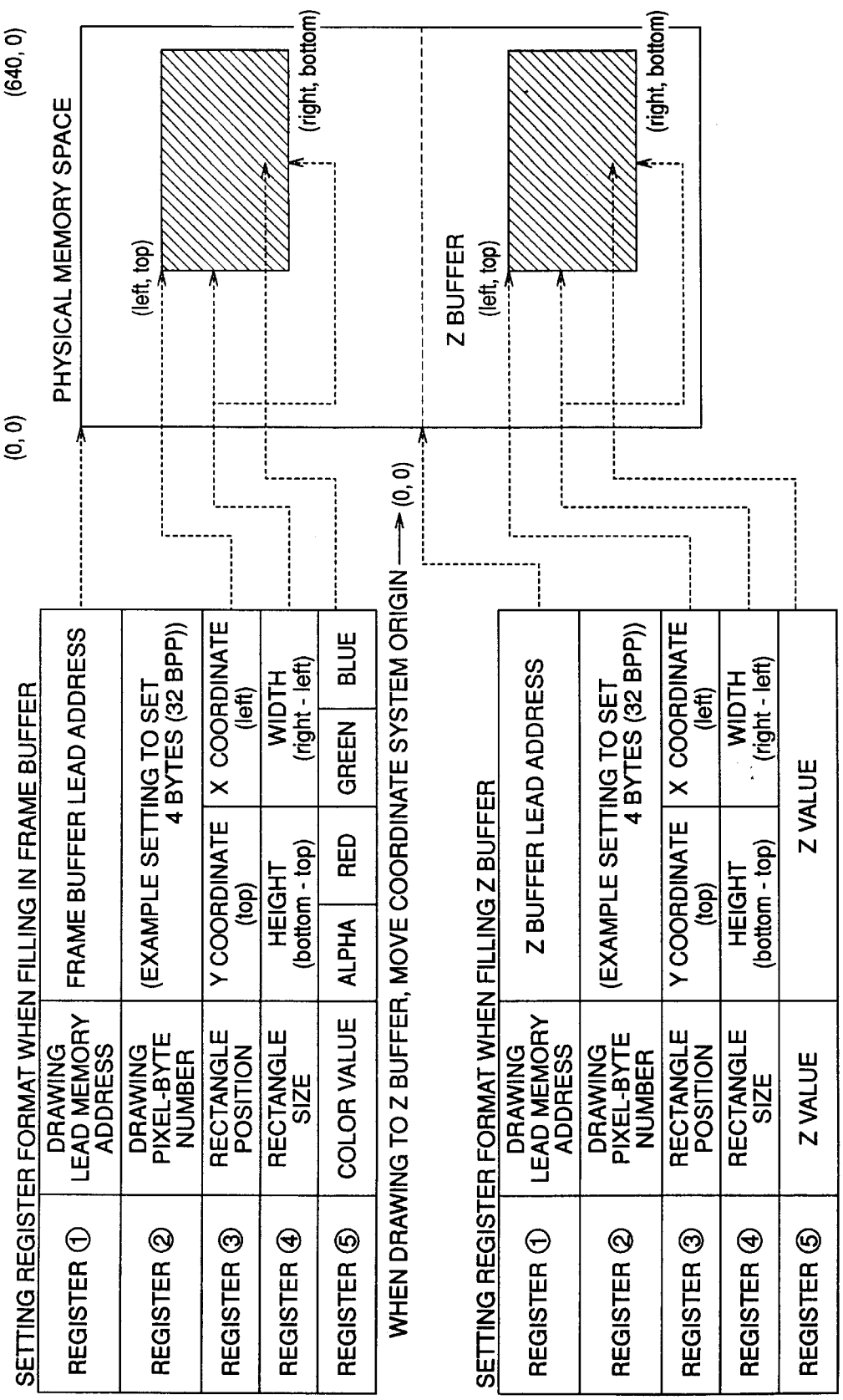

MOVEMENT OF THREE-DIMENSIONAL APPLICATION WINDOW

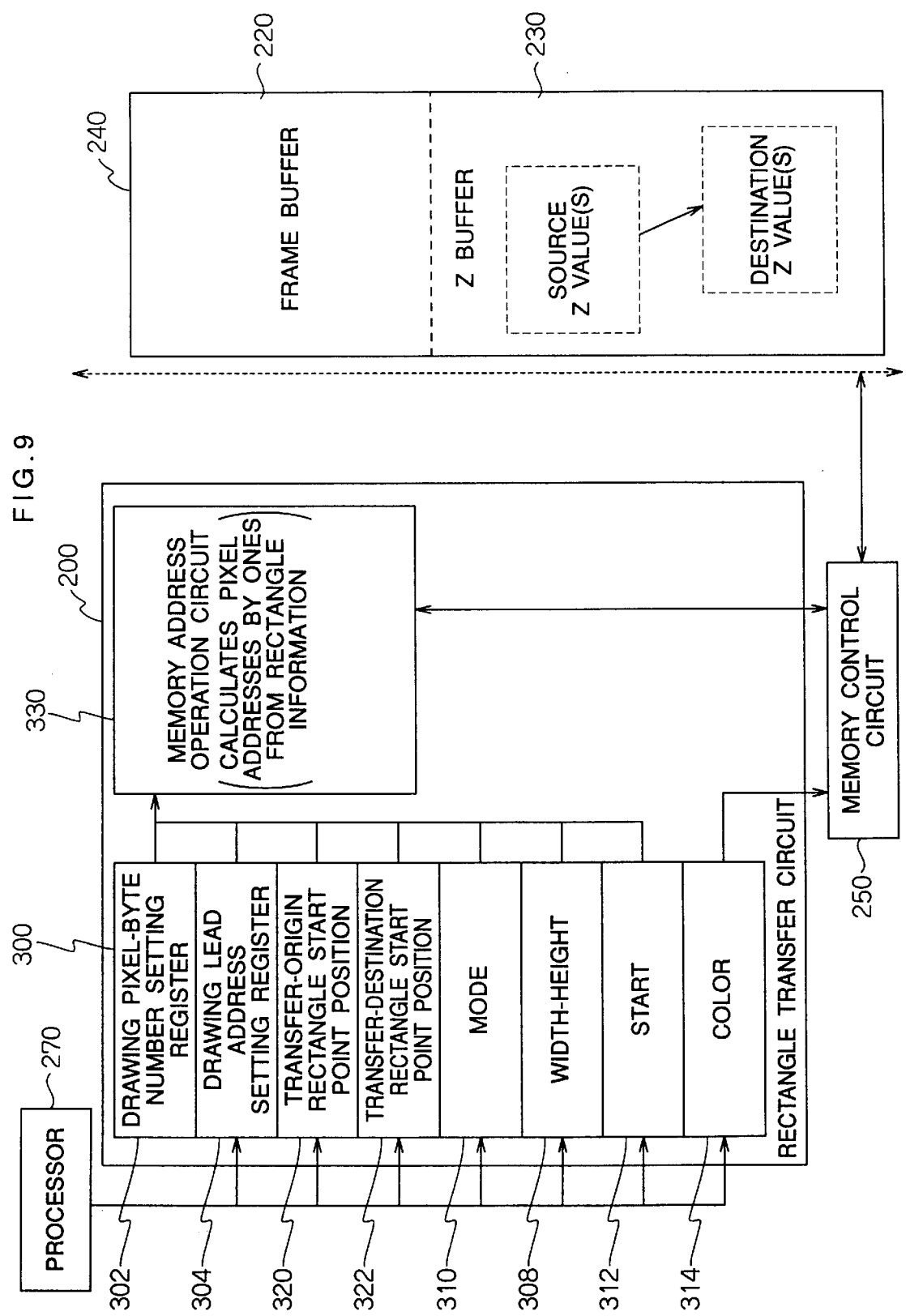

FIG. 10

SETTING REGISTERS

| MEMORY ADDRESS | REGISTER TYPE | FORMAT |
|---|---|---|
| 2000000h | DRAWING LEAD ADDRESS | WHEN DRAWING TO FRAME BUFFER = FRAME BUFFER LEAD<br>WHEN DRAWING TO Z BUFFER = Z BUFFER LEAD |
| 2000004h | DRAWING PIXEL-BYTE NUMBER | WHEN DRAWING TO FRAME BUFFER = 1, 2, OR 4 BYTES (SAME AS DISPLAY)<br>WHEN DRAWING TO Z BUFFER = 2 OR 4 BYTES |
| 2000008h | TRANSFER-ORIGIN RECTANGLE START POINT POSITION | Y COORDINATE / X COORDINATE |
| 200000ch | TRANSFER-DESTINATION RECTANGLE START POINT POSITION | Y COORDINATE / X COORDINATE |
| 2000010h | MODE | WHEN FILLING IN RECTANGLE = SET TO 1<br>WHEN TRANSFERRING RECTANGLE = SET TO 2 |
| 2000014h | WIDTH-HEIGHT | HEIGHT / WIDTH |
| 2000018h | COLOR | WHEN 8 BPP = 1 BYTE, WHEN 16 BPP = 2 BYTES,<br>WHEN 32 BPP = 4 BYTES |
| 200001ch | START | WHEN STARTING DRAWING = SET TO 1 | great_matic# HIGH SPEED IMAGE DRAWING APPARATUS FOR DISPLAYING THREE DIMENSIONAL IMAGES

BACKGROUND OF THE INVENTION

1. Field of the Invention

This invention concerns an image drawing apparatus that can perform three-dimensional drawing on a display screen of a display apparatus.

2. Description of the Related Art

FIG. 12 is a block diagram representing an example configuration of a conventional image drawing apparatus. This image drawing apparatus comprises: a CRT 10 for displaying images; a frame buffer 12 for storing display data corresponding to the display screen of the CRT 10; a two-dimensional drawing circuit 14 for drawing desired rectangular images, etc., to the frame buffer 12; a Z buffer 16 for storing depth data (Z values) for performing three-dimensional drawing to the frame buffer 12; a three-dimensional straight line drawing circuit 18 for performing three-dimensional drawing to the frame buffer 12 based on the depth data stored in the Z buffer 16; a Z buffer setting circuit 20 for setting desired rectangular area data, etc., in the Z buffer 16; a processor 22 for performing overall control of the image drawing apparatus; and a main memory 24 for providing the processor 22 with a control program and work area.

In the configuration described above, the processor 22 first produces two-dimensional data in the main memory 24. These two-dimensional data may be configured of line segments (straight lines), for example. By writing these to the frame buffer 12, images are displayed on the CRT 10.

The two-dimensional drawing circuit 14 is a dedicated circuit for writing certain two-dimensional images to the frame buffer 12 at high speed. More specifically, there are present a dedicated circuit for drawing two-dimensional straight lines, a dedicated circuit for filling in two-dimensional rectangular areas, and a dedicated circuit for transferring a two-dimensional rectangular area to another position.

With this two-dimensional drawing circuit 14, high-speed drawing is effected by regular coordinate operation actions responsive to the attributes of the two-dimensional images being drawn. This is effected by setting addresses for specifying the shapes and positions of two-dimensional images such as noted above, and, in conjunction therewith, setting drawing color data, etc. Next, three-dimensional drawing is performed using the Z buffer 16 and the three-dimensional straight line drawing circuit 18. The Z buffer stores depth data (Z values) contained in pixels (XY coordinates) drawn in the frame buffer 12.

The three-dimensional straight line drawing circuit 18 compares depth data (source Z values) for each point in the XY coordinates of three-dimensional straight lines input from the processor 22 against the depth data (destination Z values) stored beforehand in the Z buffer 16, selects the data having the smaller depth, and writes the data to the frame buffer 12.

Thus it is possible to draw natural images, even drawing three-dimensional images as two-dimensional images, by having objects in back hidden by objects in front.

FIG. 13 is a block diagram representing the configuration of the three-dimensional straight line drawing circuit 18. This three-dimensional straight line drawing circuit 18 comprises: a register 102 for storing source Z values input from the processor 22; a comparator 104 for comparing source Z values stored in the register 102 against destination Z values stored in the Z buffer 16; a raster operation processor (ROP) circuit 106 for performing logical operations on the source values and on the data present originally in the frame buffer 12 using AND, OR, XOR, or other logic circuits; a straight line operation circuit 108 for drawing straight lines to the frame buffer 12 by providing coordinate parameters for the start point and end point of straight lines to be drawn; a transfer circuit 110 for rewriting the Z buffer 16 based on the results of comparator 104 operations; a frame buffer address operation circuit 112 for generating and controlling addresses for accessing the frame buffer 12; and a Z buffer address operation circuit for generating and controlling addresses for accessing the Z buffer 16.

FIG. 14 is an explanatory diagram for describing the Z buffer operation processing for drawing any vector (straight line). When a straight line is drawn from coordinates (Xs, Ys) to coordinates (Xe, Ye), coordinates and Z values are calculated for the pixels that constitute the straight line.

The Z value calculation operations are performed up to the final coordinates (Xe, Ye) for each pixel configuring the straight line, based on the value (Zs=initial value) in the starting point coordinates (Xs, Ys) and the increase (Zi) between each pixel. The Z value computed in this way is compared with the Z value of the pixel originally at those coordinates by the comparator 104. If the newly computed Z value is smaller, the results of that computation are written to the Z buffer 16, writing the pixel to the frame buffer 12 is enabled, and a pixel is written based on the new drawing. If the newly computed Z value is larger, the Z buffer 16 and the frame memory 12 are kept the same (that is, the pixel there originally is retained).

There are also systems wherein such control is effected with software instead of with hardware in the form of the three-dimensional straight line drawing circuit 18.

There are also the following methods of setting the value of the Z buffer 16 in such an image drawing apparatus.

(1) The method of setting Z values one at a time by directly accessing the Z buffer 16 by the processor 22, and computing in the processor 22 the addresses where the Z values are set.

(2) The method of setting Z values in the Z buffer 16 using the three-dimensional straight line drawing circuit 18 described above.

(3) The method of setting Z values using the Z buffer setting circuit 20.

Of these, with the method of setting the Z values directly by the processor 22, Z values are set one at a time at points in the area established. This not only makes high-speed processing very difficult, but also puts a large burden on the processor 22 that controls the whole system.

With the method of setting Z values in the Z buffer 16 using the three-dimensional straight line drawing circuit 18, it is possible to establish the desired area by drawing one line at a time, designating a start point and end point, as described in the foregoing, for each line segment making up the scan lines in the area established. Thus, as compared to the method of direct setting with the processor 22, also described above, high-speed processing can be performed, especially for graphics of comparatively simple shape.

With this method, however, many line segments are designated in performing the drawing processing, and the process of comparing the Z value of each point is also contained, making it slower than the method in which the Z buffer setting circuit 20 is used. With the method wherein Z values are set using the Z buffer setting circuit 20, it is possible to set Z values at higher speed than when using the three-dimensional straight line drawing circuit 18.

More specifically, the Z buffer setting circuit 20 is a dedicated circuit for writing specific two-dimensional images to the Z buffer 16 at high speed. By designating two-dimensional areas inside the Z buffer 16, and also designating Z values to be set, high-speed setting is achieved by regular coordinate operation actions that are responsive to the attributes of the two-dimensional areas in which Z values are set.

It is also possible, using such a Z buffer setting circuit 20, to conduct high-speed actions to transfer a specific area in the Z buffer 16 to another area.

However, in order to perform high-speed settings and transfers to the Z buffer 16 in the conventional image drawing apparatus described above, a dedicated Z buffer setting circuit 20 must be provided, resulting in a configuration that is expensive and, hence, problematic.

Now, the two-dimensional drawing circuit 14 and the Z buffer setting circuit 20 described above have similar configurations in those parts that perform specific area coordinate operations, but are configured to handle attributes of the frame buffer 12 and Z buffer 16 that, respectively, are the objects of access, making it very difficult to use them interchangeably. The root cause of this difficulty lies in the fact that the number of bytes per pixel differs between the frame buffer 12 and the Z buffer 16.

More specifically, the number of bytes per pixel in the frame buffer 12 is determined according to the gradations of the color data stored in the frame buffer 12. With 255 gradations in each color component, for example, 1 byte of data is required per pixel for each color component. For four color components, therefore, 4 bytes (32 bits) are required.

The number of bytes per pixel in the Z buffer 16, on the other hand, is determined by the depth resolution afforded by the Z value data. If the number of bytes per pixel is increased, it becomes possible, by that same measure, to draw three-dimensional images that are more complex in the depth dimension. Two bytes of Z value data per pixel are used, for example.

The gradations of the color data stored in the frame buffer 12 and the resolution of the Z value data stored in the Z buffer 16 are usually different. Correspondingly, therefore, the configurations of these buffers also differ.

For this reason, in order to perform at high speed the processes involving these buffers 12 and 16, configured as diagramed in FIG. 12, it is necessary to separately provide a two-dimensional drawing circuit 14 for the frame buffer 12 and a Z buffer setting circuit 20 for the Z buffer 16, which hampers efforts to reduce costs.

In apparatuses wherein a Z buffer 16 is used, as described above, a high-speed system configuration is generally implemented, even if the cost is high, memory is configured with separate frame buffer and Z buffer, and separate bus interfaces are provided for the processor 22 and three-dimensional straight line drawing circuit 18, respectively. For these reasons also it is very difficult to achieve multi-use implementation of the two-dimensional drawing circuit 14 and Z buffer setting circuit 20, making it very difficult to achieve cost reductions.

SUMMARY OF THE INVENTION

An object of the present invention, therefore, is to provide an image drawing apparatus wherewith the two-dimensional drawing circuit for the frame buffer can be used also as the setting circuit for the Z buffer, so that both Z buffer high-speed setting processing and cost reductions can be realized at one and the same time.

In order to achieve that object, the present invention is an image drawing apparatus comprising: a frame buffer for storing display data corresponding to a display apparatus display screen; a two-dimensional drawing circuit for performing coordinate operations in order to draw specific two-dimensional images in the frame buffer; a Z buffer for storing depth data for performing three-dimensional drawing to the frame buffer; a three-dimensional straight line drawing circuit for performing three-dimensional drawing in the frame buffer, based on the depth data stored in the Z buffer; a memory control circuit for setting areas of the frame buffer and Z buffer in the same physical memory and also controlling access to each buffer; and a bit number altering circuit for changing the number of bits per pixel in the coordinate operations of the two-dimensional drawing circuit to either a number of bits corresponding to drawing data in the frame buffer or to a number of bits corresponding to the depth data in the Z buffer; wherein: drawing to the frame buffer and setting depth data in the Z buffer are conducted selectively by the coordinate operations of the two-dimensional drawing circuit.

In the image drawing apparatus of the present invention, both frame buffer and Z buffer areas are established as appropriate in the same physical memory, and the two buffer areas are selectively accessed by the two-dimensional drawing circuit.

When the frame buffer is accessed from the two-dimensional drawing circuit, this access is accomplished after altering, by the bit number altering circuit, the number of bits per pixel in the coordinate operations of the two-dimensional drawing circuit to a number of bits corresponding to the drawing data in the frame buffer. And when accessing the Z buffer from the two-dimensional drawing circuit, the number of bits per pixel in the coordinate operations of the two-dimensional drawing circuit are changed by the bit number altering circuit to the number of bits corresponding to the depth data in the Z buffer.

Thus it is possible, using a common two-dimensional drawing circuit, to draw and transfer specific images to the frame buffer, and to set and transfer specific areas in the Z buffer, at high speed.

In the image drawing apparatus of the present invention, by establishing both frame buffer and Z buffer areas in the same physical memory, and altering the number of bits per pixel in the coordinate operations of the two-dimensional drawing circuit, drawing to the frame buffer and setting depth data in the Z buffer can be performed selectively by coordinate operations of the two-dimensional drawing circuit.

Thus the two-dimensional drawing circuit for the frame buffer can be used as the setting circuit for the Z buffer, and depth data can be set to the Z buffer at higher speed without providing a dedicated Z buffer setting circuit, thereby realizing both high-speed setting processing for the Z buffer and reduced costs. By giving the Z buffer the same configuration as the frame buffer, using a memory control circuit, it is possible to set two frame buffers of equal size and number of bits per pixel in the physical memory, to alternately perform drawing to each frame buffer without altering the number of bits using a bit number altering circuit, and thus to create a system wherein the frame buffers can be used as double buffers for animation.

BRIEF DESCRIPTION OF THE DRAWINGS

FIG. 2 is a block diagram of a two-dimensional drawing circuit provided in the image drawing apparatus diagrammed in FIG. 1;

FIG. 3 is an explanatory chart indicating specific examples of register circuits provided in the two-dimensional drawing circuit diagrammed in FIG. 2;

FIGS. 5(A)–5(B) are an explanatory diagram for an example of setting a color setting register for the same rectangle in the frame buffer and Z buffer in the image drawing apparatus diagrammed in FIG. 1;

FIG. 6 is an explanatory diagram representing how, by setting the register diagrammed in FIG. 5, to fill in a rectangular area in the frame buffer and set a Z value in the Z buffer rectangular area;

FIG. 9 is a block diagram of a two-dimensional drawing circuit in an image drawing apparatus based on a second embodiment of the present invention;

FIG. 10 is an explanatory chart indicating specific examples of register circuits provided in the two-dimensional drawing circuit diagrammed in FIG. 9;

DESCRIPTION OF THE PREFERRED EMBODIMENTS

Embodiments of image drawing apparatuses based on the present invention are now described.

Figure 1:
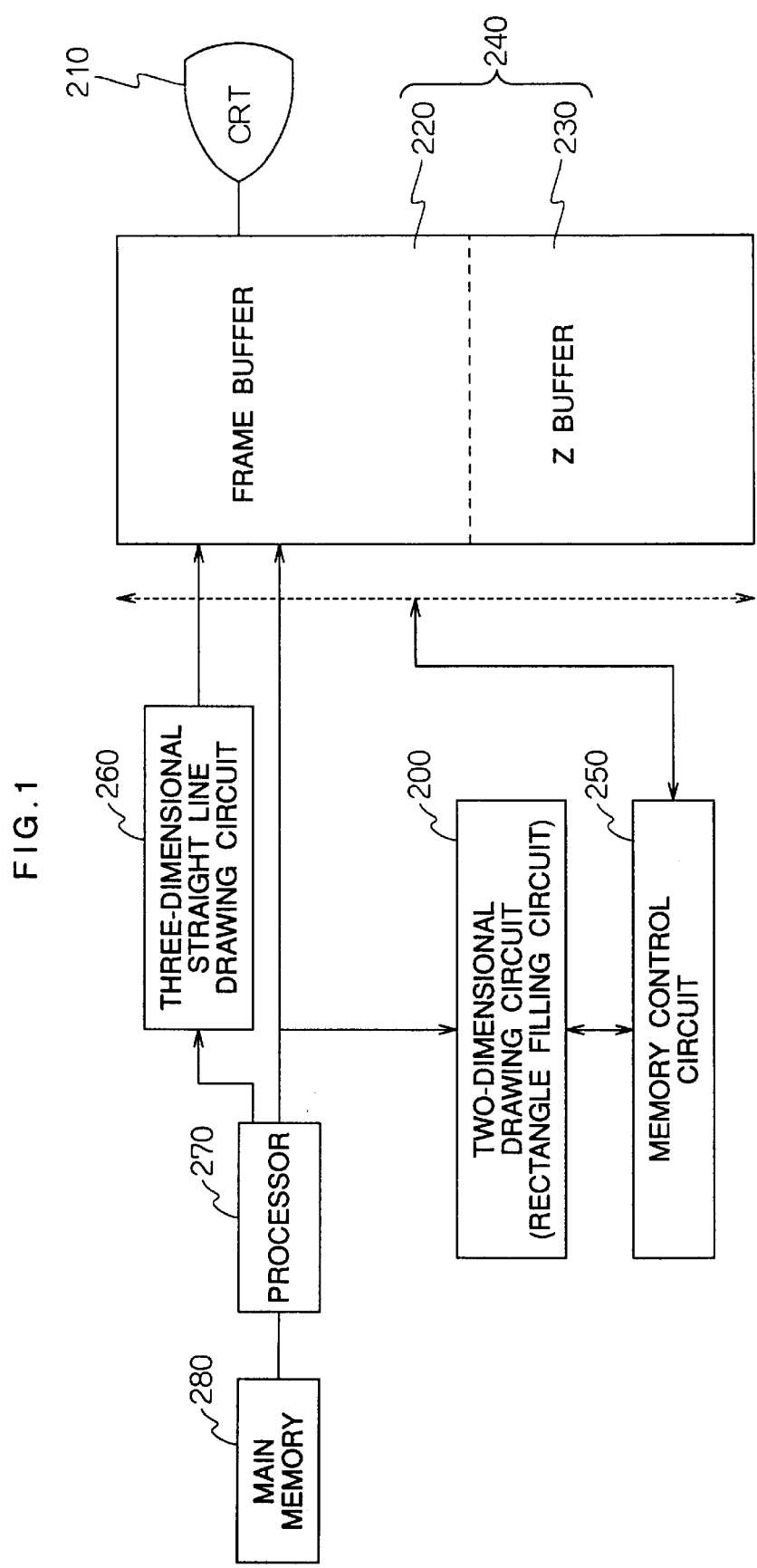
FIG. 1 is a block diagram of an image drawing apparatus based on a first embodiment of the present invention.

FIG. 1 is a block diagram of an image drawing apparatus based on a first embodiment of the present invention.

This image drawing apparatus comprises: a CRT 210 for displaying images; a buffer memory 240 providing a frame buffer 220 for making displays on the CRT 210 and a Z buffer 230 for three-dimensional drawing; a two-dimensional drawing circuit 200 for drawing desired rectangular areas in the buffer memory 240 and making settings, etc.; a memory control circuit 250 for setting buffer areas for the buffer memory 240 and controlling access thereto; a three-dimensional straight line drawing circuit 260 for performing three-dimensional drawing to the frame buffer 220 based on Z value data stored in the Z buffer 230; a processor 270 for performing overall control of the image drawing apparatus; and a main memory 280 for providing a control program and work area for the processor 270.

Figure 13:
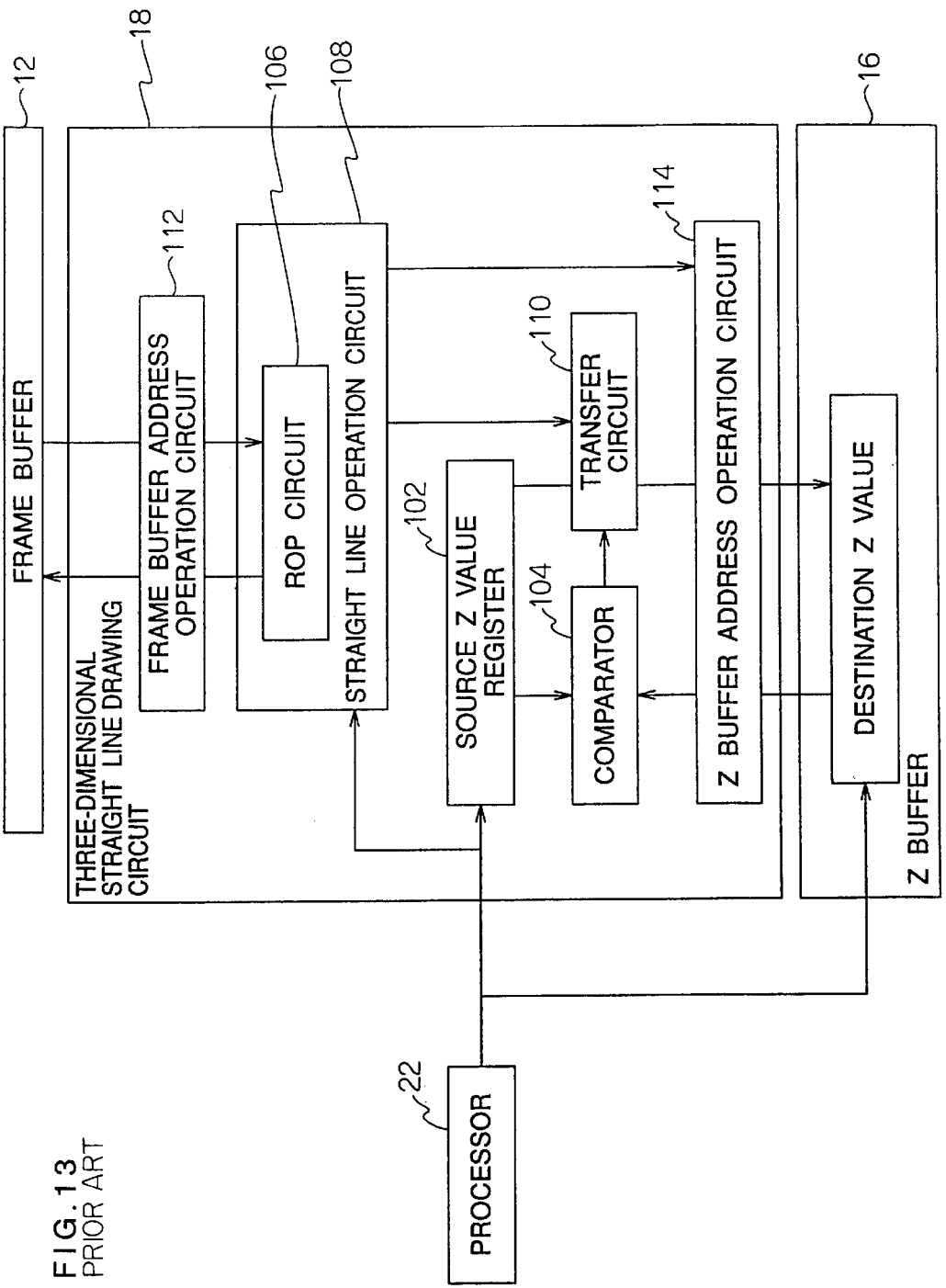
FIG. 13 is a block diagram of a three-dimensional straight line drawing circuit in the image drawing apparatus diagrammed in FIG. 12.
Figure 14:
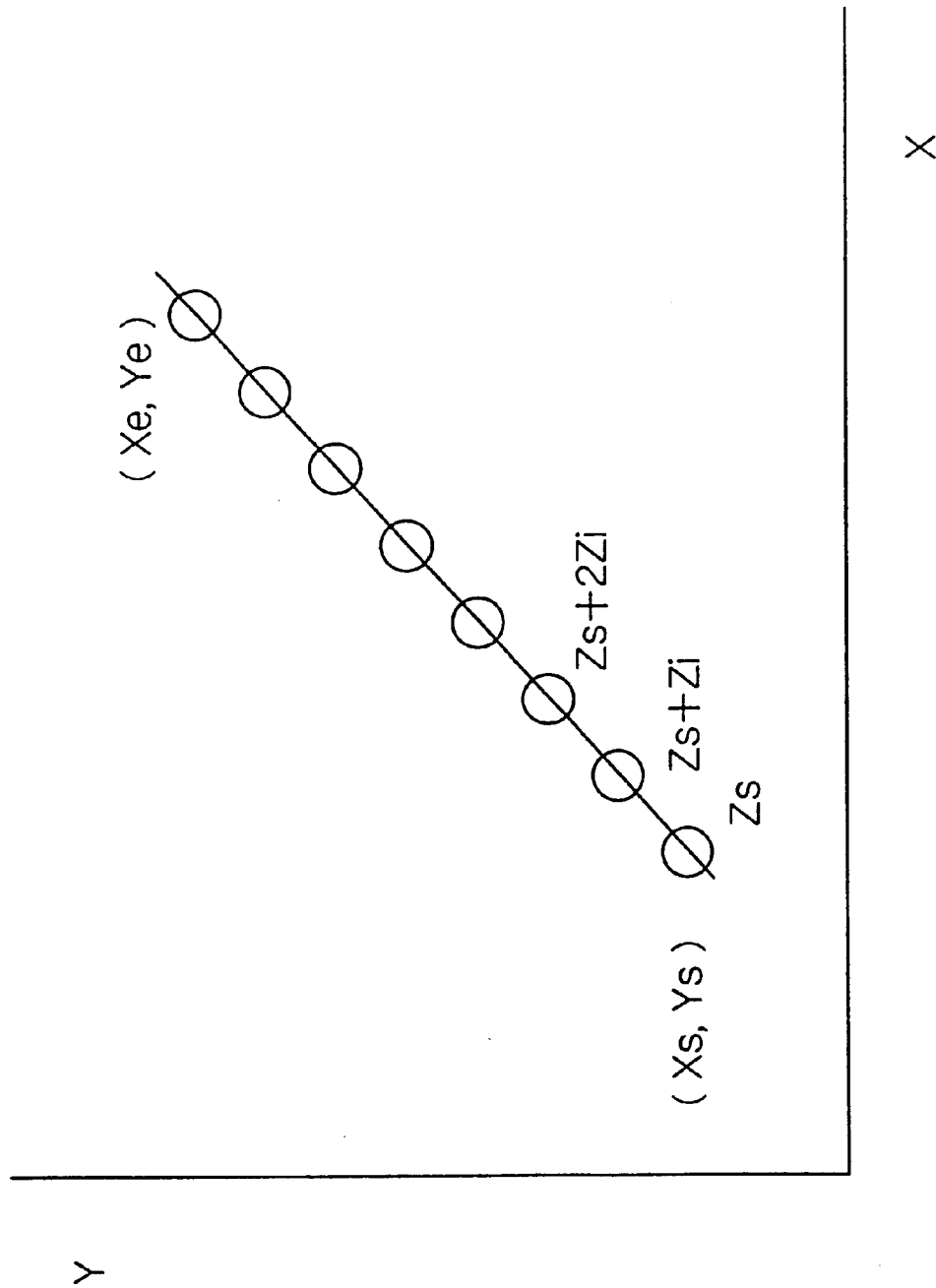
FIG. 14 is an explanatory diagram for describing the Z buffer operation processing for drawing any vector (straight line) using the three-dimensional straight line drawing circuit diagrammed in FIG. 13.

The three-dimensional straight line drawing circuit 260, as the three-dimensional straight line drawing circuit 18 diagrammed in FIG. 13, draws three-dimensional straight lines to the frame buffer 220 using the principle diagrammed in FIG. 14. The processor 270 supplies the source Z values discussed earlier to the three-dimensional straight line drawing circuit 260. The three-dimensional straight line drawing circuit 260 compares the source Z values from the processor 270 against the destination Z values stored in the Z buffer 230 and, based on the results of such comparison, draws three-dimensional straight lines to the frame buffer 220.

In the image drawing apparatus in this embodiment, the frame buffer 220 and Z buffer 230 are provided in the buffer memory 240, that is, in the same physical memory, and the two-dimensional drawing circuit 200 can, by means of the memory control circuit 250, freely access both of the buffers 220 and 230.

In this embodiment, moreover, the frame buffer 220 has a size of 640×280 pixels, and stores 8 bits, 16 bits, or 32 bits of color data per pixel.

The number of bits per pixel in the frame buffer 220 is determined by the color data gradations, as noted earlier. The color data gradations are determined by the application software or by operator input from a keyboard (not shown), etc.

Let it be assumed here that the lead address in the frame buffer 220 is 3000000h, where the h at the end indicates that this is a hexadecimal number.

The Z buffer 230 here has a size of 640×480 pixels, set up so as to represent depths in terms of Z values that are either 16 or 32 bits per pixel.

The number of bits per pixel in the Z buffer 230 is determined by the depth resolution provided by the Z value data, as noted earlier. The depth resolution provided by the Z value data is determined either by the application software or by operator input from a keyboard, etc.

The lead address of the Z buffer 230 is 3004B00h.

The two-dimensional drawing circuit 200 in this embodiment is configured to perform processing to fill in rectangular areas. It performs processing to fill in desired rectangular areas in the desired color for the frame buffer 220. It also sets Z values in the desired rectangular area for the Z buffer 230 and performs initializing processing, for example.

FIG. 2 is a block diagram of the two-dimensional drawing circuit 200.

As diagrammed in this figure, the two-dimensional drawing circuit 200 comprises a register circuit 300 for setting various parameters for performing processing to fill in rectangular areas, and a memory address operation circuit 330 for performing address operations on the frame buffer 220 and Z buffer 230, based on the parameters set in the register circuit 300.

The register circuit 300 comprises a drawing pixel-byte number setting register 302, a drawing lead address setting register 304, a start point setting register 306, a width-height register 308, a drawing mode setting register 310, a start setting register 312, and a color setting register 314.

The setting of the various parameters for this register circuit 300 is done by the processor 270, prior to accessing the frame buffer 220 or Z buffer 230, based on operator inputs from the keyboard or the application software. The processor 270, when drawing rectangles to the frame buffer 220 or drawing rectangles (setting Z data) to the Z buffer

230, makes settings to change the drawing lead address or drawing pixel-byte number.

The two-dimensional drawing circuit 200 computes addresses for drawing pixels of rectangular areas in the memory address operation circuit 330, based on the parameters set in the register circuit 300 described above, and outputs these addresses to the memory control circuit 250.

The memory control circuit 250, based on addresses from the memory address operation circuit 330, accesses the frame buffer 220 or Z buffer 230, and writes Z value data or color data stored in the color setting register 314.

Thereupon, based on the drawing lead address set in the drawing lead address setting register 304, whether to access the frame buffer 220 or the Z buffer 230 is determined.

Also, depending on the number of bytes set in the drawing pixel-byte setting register 302, data writing is performed using a number of bytes corresponding to the frame buffer 220 when that buffer is being accessed, and data writing is performed using a number of bytes corresponding to the Z buffer 230 when that buffer is being accessed.

The functions of the various parameters set in the start point setting register 306, width-height register 308, drawing mode setting register 310, and start setting register 312, are common both to cases of accessing the frame buffer 220 and cases of accessing the Z buffer 230.

The address operations in the memory address operation circuit 330 are performed synchronously with data writing actions in the memory control circuit 250, based on synchronous signals from the memory control circuit 250, for example.

The two-dimensional drawing circuit 200 is now described in greater detail.

FIG. 3 is an explanatory chart indicating specific examples of correlations between memory addresses and formats for the various setting registers in the register circuit 300 in this embodiment. The register circuit 300 in this embodiment has a data width of 32 bits, with a lead address, let it be assumed, of 2000000h in the register circuit 300.

The drawing pixel-byte number setting register 302 configures a bit number altering circuit. This is a register that sets the number of bits per pixel, in byte units, when calculating addresses for rectangles, corresponding to the buffer 220 or 230 that is being accessed. If the number of bits per pixel is 8, 0h is set; if 16, 1h is set; and if 32, 2h is set.

The drawing lead address setting register 304, according as to whether the object of access is buffer 220 or 230, sets the memory address for the origin (0, 0) in the system of coordinates wherein the rectangle being drawn is designated.

The start point setting register 306 is a register that sets the pixel coordinates at the upper left point in a rectangle to be filled in, representing the Y coordinate by the higher 16 bits and the X coordinate by the lower 16 bits.

The width-height register 308 sets data representing the width and height of a rectangle to be filled in, expressing the height by the higher 16 bits and the width by the lower 16 bits. In this embodiment, moreover, rectangles are designated by the upper left point in the rectangle and the width and height of the rectangle.

Instead, however, it is permissible to designate rectangles by the upper left point and lower right point in the rectangle. The drawing mode setting register 310 is a register that selects straight line drawing or rectangle drawing, setting 1h when filling in a rectangle.

The start setting register 312 is a register for designating the start of drawing. Drawing is initiated by setting a 1 in this register 312.

The color setting register 314 is a register for setting rectangle fill colors and rectangle Z values, depending on the value set in the drawing pixel-byte setting register 302. If this value represents 8 bits (1 byte), 8-bit-based color data are set; if 16 bits (2 bytes), 16-bit-based color data or Z values are set; and if 32 bits (4 bytes), 32-bit-based color data or Z values are set. When the Z buffer 230 has been cleared, 0h is set in the color setting register 314, and 0-clearing data are written to each point.

In three-dimensional drawing using the Z buffer 230, the necessity of clearing the Z buffer 230 arises frequently. By writing a rectangle to the Z buffer 230 with a two-dimensional drawing circuit 200 like that described above, the Z buffer 230 can be cleared fast. Because voluminous memory accesses are required for this clearing operation, the processing can be done at high speed using the two-dimensional drawing circuit 200.

Figure 4A:
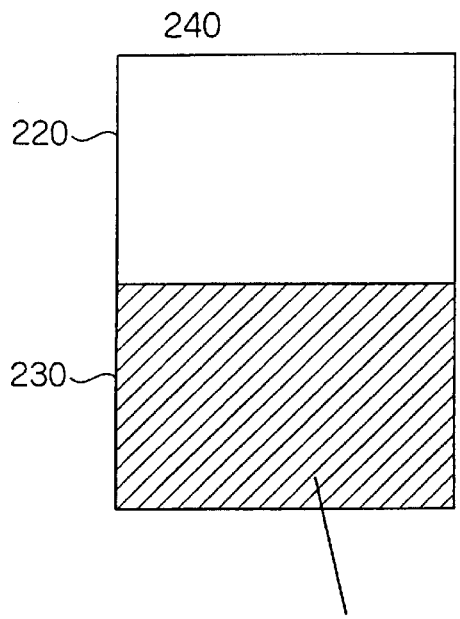
FIGS. 4(A)–4(B) are a set of explanatory diagrams representing how a Z buffer rectangular space is cleared in the image drawing apparatus diagrammed in FIG. 1.

FIG. 4(A) diagrams the situation wherein the entire Z buffer 230 has been cleared by 0h rectangular data corresponding to the entire area of the Z buffer 230.

Figure 4B:
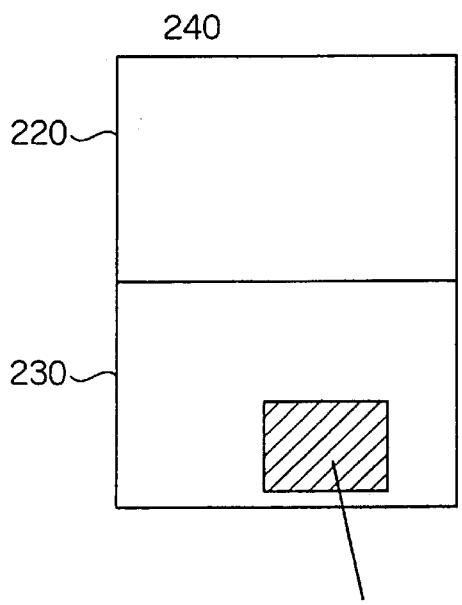

As diagrammed in FIG. 4(B), however, a window displayed on the CRT 210 screen can also be 0-cleared.

When the number of data bits (number of bytes) per pixel differs between the frame buffer 220 and Z buffer 230, moreover, the calculation formula for calculating the physical address from rectangle start point and width-height data must be changed. By providing the drawing pixel-byte number setting register 302, however, rectangles can be designated by the method of designating coordinates (x, y) in the frame buffer 220 when filling them in on the frame buffer 220, and rectangles can be designated in a coordinate system (x, y) on the Z buffer 230 when filling them in on the Z buffer 230.

In other words, by using this register 302, the common two-dimensional drawing circuit 200 can be used even though the number of bytes per pixel differs between the frame buffer 220 and Z buffer 230.

The memory address operation circuit 330 calculates addresses point by point for the pixels being drawn, based on the setting parameters in the register circuit 300 as described above. FIG. 5 is an explanatory diagram showing an example of settings in the color setting register 314 for the same rectangle in both the frame buffer 220 and Z buffer 230.

FIG. 5(A) diagrams a row of drawing data for the frame buffer 220. "ALPHA," "RED," "GREEN," and "BLUE" data are set, designating the color to be filled in, in the color setting register 314. FIG. 5(B) diagrams a row of Z values for the Z buffer 230, setting "Z" as the Z value data.

The same values are set in the start point setting register 306 and width-height register 308.

FIG. 6 diagrams the situation wherein a rectangular area is filled in, in the frame buffer 220, by the register settings shown in FIG. 5(A), and the situation wherein Z values are set in a rectangular area in the Z buffer 230 by the register settings indicated in FIG. 5(B).

In FIG. 6, moreover, register 1. is the drawing lead address setting register 304, register 2. is the drawing pixel-byte number setting register 302, register 3. is the start point setting register 306, register 4. is the width-height register 308, and register 5. is the color setting register 314.

The two-dimensional drawing circuit 200 is configured so that it is normally held in a state wherein it stores display data by the frame buffer 220, so that it rewrites setting data temporarily to the Z buffer 230 only when making settings in the Z buffer 230, and so that it automatically rewrites data to the frame buffer 220 after completing the settings in the Z buffer 230.

In the case where, for example, the Z buffer 230 uses 32 bits per pixel and the frame buffer 220 uses some other number of bits per pixel, the drawing pixel-byte number setting register 302 of the two-dimensional drawing circuit 200 is temporarily set at 32 bits, and, after making settings to the Z buffer 230, the drawing pixel-byte number setting register 302 is changed to a value conforming to the frame buffer 220.

The procedures for clearing the entire area of the Z buffer 230 in this embodiment is described next.

Figure 7:
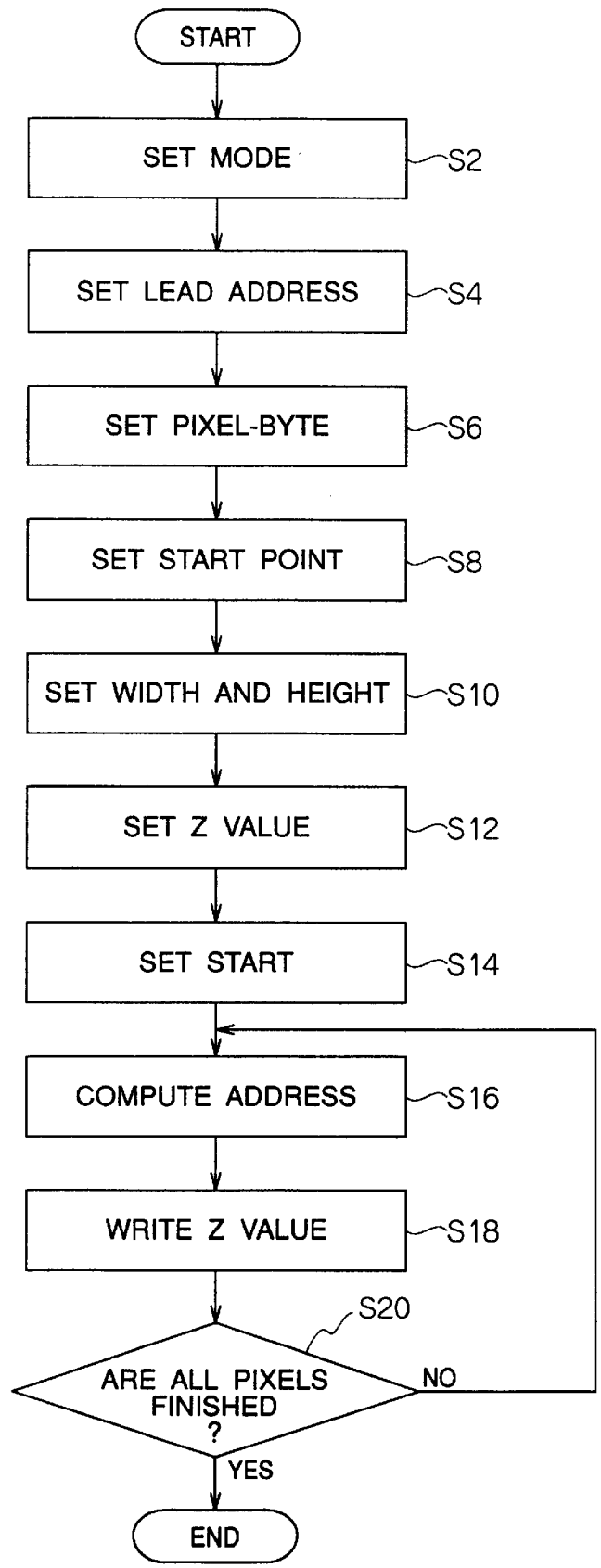
FIG. 7 is a flowchart of actions for clearing the Z buffer in the image drawing apparatus diagrammed in FIG. 1.

FIG. 7 is a flowchart of the procedures for clearing the Z buffer 230.

First, register circuit 300 settings are made by the processor 270. Initially, a value of 1h is set in the drawing mode setting register 310 to designate the rectangle fill mode (step S2). Next, the drawing lead address setting register 304 is set to 3004B00h (step S4).

Next, 32 bpp=2h is set in the drawing pixel-byte number setting register 302 (step S6), where bpp indicates the number of bits per pixel.

Next, (0, 0)=0h is set in the start point setting register 306 (step S8). Next the width-height register 308 is set to (width 640, height 480) (step S10). In other words, the entire area of the Z buffer 230 is designated here in order to clear the entire area of the Z buffer 230.

The color setting register 314 is set to 0h (Z value=0) (step S12), and 1h is set in the start setting register 312 (step S14), thereby initiating the clearing process.

First of all, when the clearing process is initiated, drawing point addresses are calculated by the numerical formula noted below in the memory address operation circuit 330 of the two-dimensional drawing circuit 200, and these are sent to the memory control circuit 250 (step S16).

DRAWING POINT ADDRESS=LEAD ADDRESS+X COORDINATE×DRAWING PIXEL-BYTE NUMBER+Y COORDINATE×DRAWING PIXEL-BYTE NUMBER×NUMBER OF PIXELS IN 1 SCAN LINE

The memory control circuit 250 writes the values of the color setting register 314 at the aforesaid addresses sent from the two-dimensional drawing circuit 200 (step S18).

When one writing has come to an end, the memory address operation circuit 330 of the two-dimensional drawing circuit 200 calculates the next drawing point (step S16), references the drawing pixel-byte number, advances the address by the number of bytes per pixel, and writes the value in the color setting register 314 at the next drawing point (step S18).

When drawing has been done to the right edge of the rectangular area, the address is advanced by the difference (number of bytes in scan line-number of bytes in rectangle width), and values are written for the drawing point on the next scan line. A determination is made (in step S20) as to whether or not the action described above has been executed for all of the pixels in the rectangular area. If this has not been finished, step S16 is returned to and steps S16 and S18 are executed.

Thus, in the image drawing apparatus in this embodiment, the Z buffer 230 can be cleared or rewritten using the two-dimensional drawing circuit 200 for the frame buffer 220, making it possible to realize high-speed Z buffer 230 settings in a low-cost configuration.

A second embodiment of the present invention is now described. In the embodiment described in the foregoing, the description pertains to the case where a rectangle filling circuit is adopted as the two-dimensional drawing circuit 200. In this embodiment, however, the description pertains to a case where a rectangle transfer circuit is adopted as the two-dimensional drawing circuit 200.

Figure 8A:
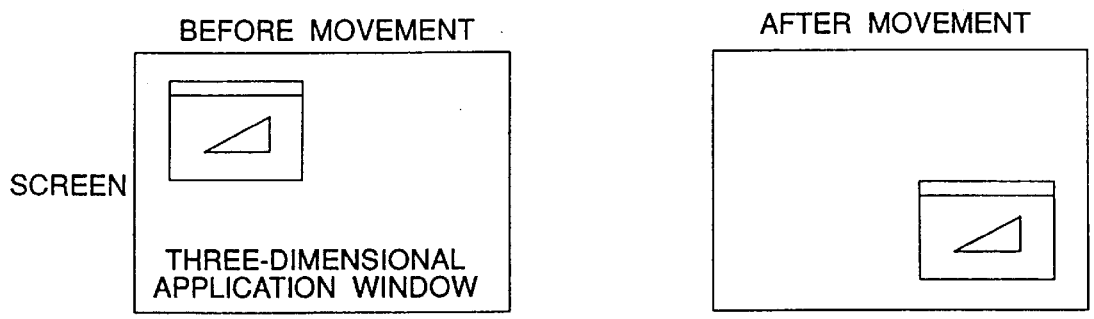
FIGS. 8(A)–8(C) are a set of explanatory diagrams showing how frame buffer drawing data and Z buffer Z value data move in conjunction with movement on a CRT screen in a window, in a window displaying system.
Figure 8B:
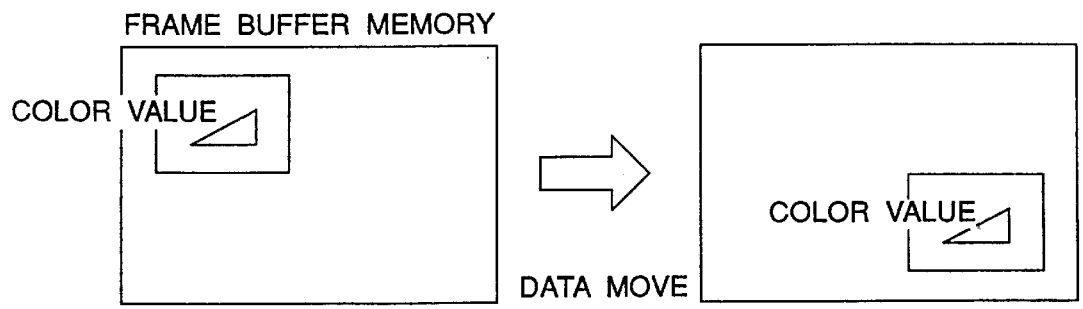
Figure 8C:
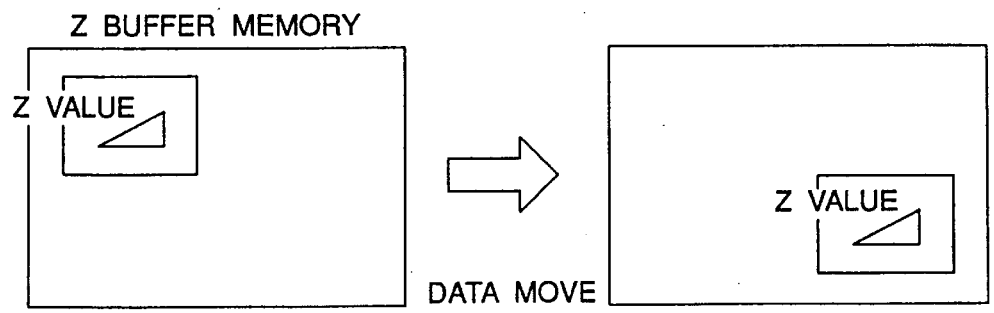

In a window type operating system (OS), the application windows frequently move. For this reason, in a system employing a Z buffer, in addition to moving data on the frame buffer, it is also necessary to move data on the Z buffer corresponding to the window rectangle. FIG. 8 diagrams how drawing data in the frame buffer 220 and Z value data in the Z buffer 230 move in conjunction with the movement of such a window on the CRT screen.

In this figure, at (A) is represented a case where a three-dimensional application window moved from the upper left to the lower right on the CRT screen, at (B) a case where color value data for a rectangular area in the frame buffer 220 moved, and at (C) a case where Z value data for a rectangular area in the Z buffer 230 moved.

In this embodiment, the movement of rectangle data in the Z buffer is performed at high speed using the two-dimensional drawing circuit 200.

FIG. 9 is a block diagram of the two-dimensional drawing circuit 200 in this embodiment.

As diagrammed here, the register circuit 300 of the two-dimensional drawing circuit 200 is modified, in part, relative to the configuration diagrammed in FIG. 2. Specifically, the two-dimensional drawing circuit 200 in this embodiment comprises a transfer-origin rectangle start point position setting register 320 for storing transfer-origin rectangle start point addresses, and a transfer-destination rectangle start point position setting register 322 for storing transfer-destination rectangle start point addresses.

This embodiment also comprises a drawing pixel-byte number setting register 302, a drawing lead address setting register 304, a width-height register 308, a drawing mode setting register 310, a start setting register 312, and a color setting register 314, each have the same functions as in the embodiment diagrammed in FIG. 2.

FIG. 10 is an explanatory diagram that provides specific examples of correlations between memory addresses and formats for the setting registers in the register circuit 300 in this embodiment. The transfer-origin rectangle starting point position setting register 320 stores the pixel coordinates for the upper left point in the transfer-origin rectangular area. The Y coordinate is stored in the higher 16 bits and the X coordinate in the lower 16 bits.

The transfer-destination rectangle starting point position setting register 322 stores the pixel coordinates for the upper left point in the transfer-destination rectangular area. The Y coordinate is stored in the higher 16 bits and the X coordinate in the lower 16 bits.

In this embodiment, moreover, the transfer-destination rectangle position is described as (10, 70), the transfer rectangle width and height as (210, 50), and the transfer-destination rectangle position as (130, 200).

The color setting register 314 in this embodiment stores the Z value set in an area after the transfer-origin rectangular area has been cleared by transferring [its contents]. In this example the color setting register 314 stores the value 0h.

The procedures for transferring a rectangular area in the Z buffer 230 are next described.

Figure 11:
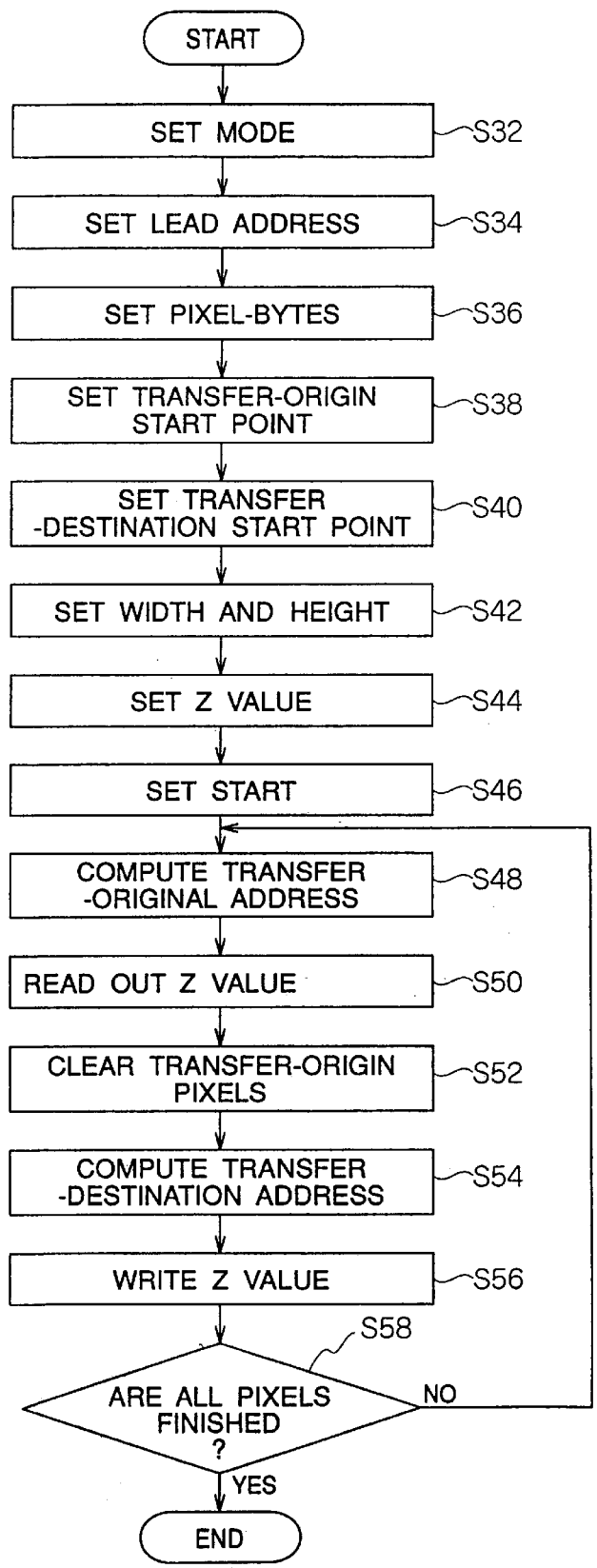
FIG. 11 is a flowchart of actions for transferring a Z buffer rectangular area in the image drawing apparatus diagrammed in FIG. 1.
Figure 12:
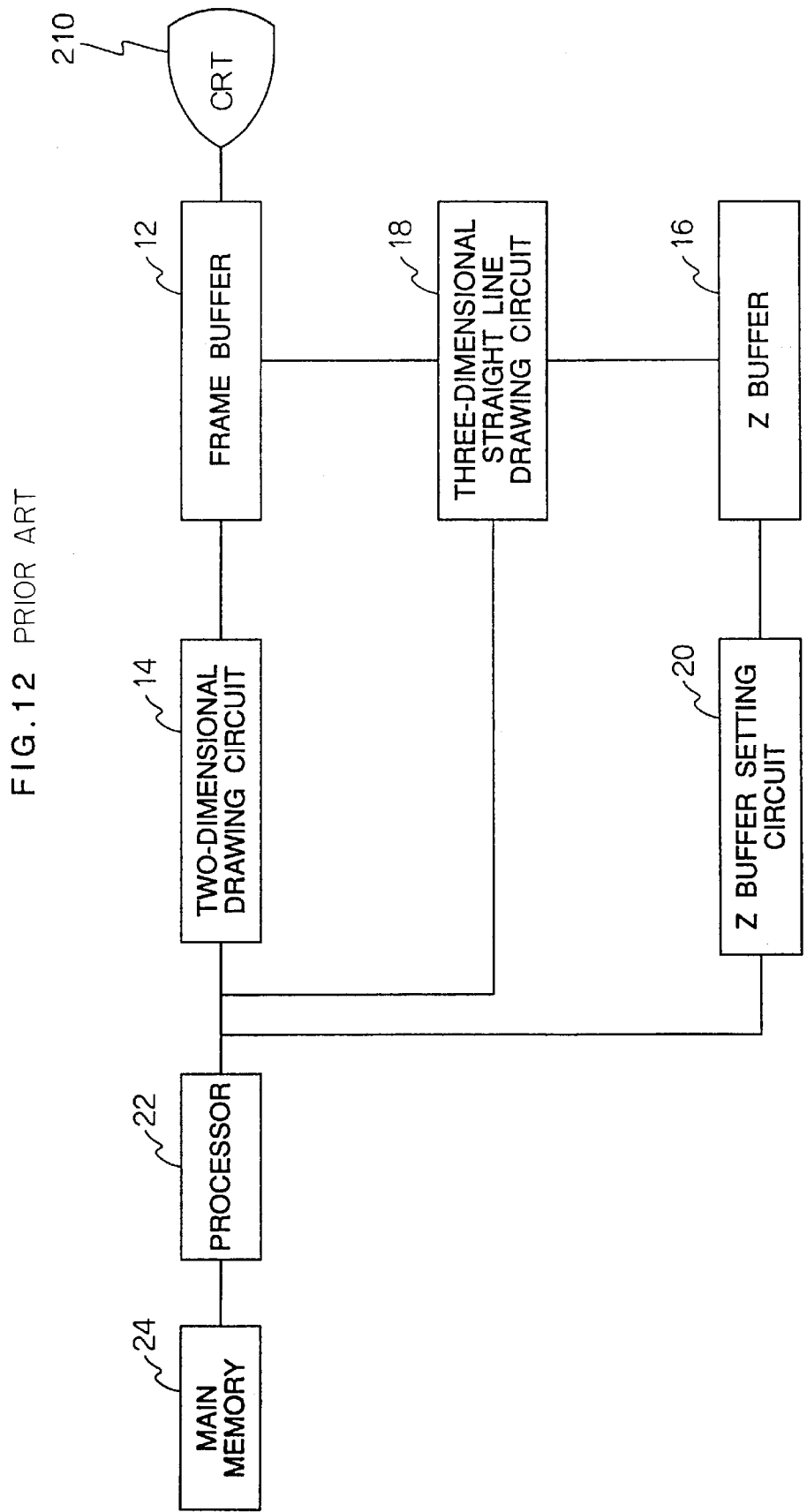
FIG. 12 is a block diagram of one example of a conventional image drawing apparatus.

FIG. 11 is a flowchart for the procedures used when transferring [the contents of] the Z buffer 230.

First, settings are made in the register circuit 300 by the processor 270. Initially, 2h is set in the drawing mode setting register 310 to designate the rectangle transfer mode (step S32). Next, 3004B00h is set in the drawing lead address setting register 304 (step S34). Then 32 bpp=2h is set in the drawing pixel-byte number setting register 302 (step S36).

Next, (10, 70) is set in the transfer-origin rectangle starting point position setting register 320 (step S38). Then (130, 200) is set in the transfer-destination rectangle starting point position setting register 322 (step S40). Next, (width 210, height 50) is set in the width-height register 308 (step S42). Next, 0h (Z value=0) is set in the color setting register 314 (step S44), and 1h is set in the start setting register 312 (step S46), initiating the clearing process.

When the clearing process is initiated, the addresses of the drawing points in the transfer-origin rectangular area are calculated, using the numerical formula given below, by the memory address operation circuit 330 of the two-dimensional drawing circuit 200, and these addresses are sent to the memory control circuit 250 (step S48).

DRAWING POINT ADDRESS=LEAD ADDRESS+X COORDI-NATE×DRAWING PIXEL-BYTE NUMBER+Y COORDI-NATE×DRAWING PIXEL-BYTE NUMBER×NUMBER OF PIXELS IN 1 SCAN LINE

The memory control circuit 250 reads out the Z value from the Z buffer 230 corresponding to the address sent from the two-dimensional drawing circuit 200 and stores it in a transfer register (not shown) (step S50). Then the value (0h) in the color setting register 314 is written at that address (step S52).

Next, using the same formula as used in step S48, the addresses of the drawing points in the transfer-destination rectangular area are computed and sent to the memory control circuit 250 (step S54). The memory control circuit 250 writes the Z value stored in the transfer register mentioned above at the address sent from the two-dimensional drawing circuit 200 (step S56).

When one transfer has been concluded, step S48 is returned to and the next drawing point is transferred. This action is executed for all of the pixels in the rectangular area (step S58).

Thus, in the image drawing apparatus of this embodiment, rectangular areas in the Z buffer 230 can be transferred using the two-dimensional drawing circuit 200 that is for the frame buffer 220, and hence the Z buffer 230 can be rewritten at high speed in a low-cost configuration.

A third embodiment of the present invention is now described. In the image drawing apparatus in this embodiment, the Z buffer 230 is made to have the same size as the frame buffer 220 and the number of bits per pixel is made common to both, thus configuring a double buffer system having two frame buffers.

This double buffer system is a display system for use in animation. In this system, while displaying one screen (frame) of animation stored in one frame buffer, the screen (frame) to be displayed next is drawn in the other frame buffer. By effecting hardware-controlled changes between these frame buffers, the system implements animation at higher speeds and prevents screen irregularities during the drawing operations. In the image drawing apparatus described in the foregoing, by means of the functions of the drawing lead address setting register 304, two frame buffers are configured in the buffer memory 240, and animation drawing is performed with the two frame buffers selected alternately by the memory control circuit 250. Simultaneously therewith, the frame buffers displayed on the screen of the CRT 210 are changed alternately. Thus the system can function as a double buffer system.

By combining such functions of the double buffer system with the three-dimensional image drawing functions described above, or with a window display system, the buffer memory 240 can be widely used in various applications, making it possible in particular to provide an effective apparatus that can support multimedia applications.

In the embodiments set forth above, descriptions have been given for cases wherein a two-dimensional drawing circuit for drawing and transferring two-dimensional rectangles is provided. However, the p resent invention can likewise be applied in cases where a two-dimensional drawing circuit for drawing two-dimensional straight lines is provided.

The entire disclosure of Japanese Patent Application No. 09-247073 (Filed on Sep. 11, 1997) including specification, claims, drawings and summary are incorporated herein by reference in its entirety.

What is claimed is:

1. A three-dimensional image drawing apparatus comprising:
    a frame buffer for storing display data corresponding to a display apparatus display screen;
    a two-dimensional drawing circuit for performing coordinate operations in order to draw specific two-dimensional images to said frame buffer;
    a Z buffer for storing depth data for performing three-dimensional drawing to said frame buffer;
    a three-dimensional straight line drawing circuit for performing three-dimensional drawing to said frame buffer based on said depth data stored in said Z buffer;
    a memory control circuit for controlling access to the buffers; and
    a bit number altering circuit for altering the number of bits per pixel in coordinate operations in said two-dimensional drawing circuit either to a number of bits corresponding to drawing data in said frame buffer or to a number of bits corresponding to depth data in said Z buffer; wherein:
    areas of said frame buffer and Z buffer are established in same physical memory; and
    said bit number altering circuit selectively performs drawing to said frame buffer and setting of depth data to said Z buffer by coordinate operations of said two-dimensional drawing circuit, by altering the number of bits per pixel in the coordinate operations of said two-dimensional drawing circuit.

2. The image drawing apparatus according to claim 1, wherein said bit number altering circuit alters the number of bits per pixel in byte units.

3. The image drawing apparatus according to claim 1, wherein said bit number altering circuit sets a number of bits corresponding either to said frame buffer or to said Z buffer in a bit number setting circuit that sets the number of bits per pixel and that is provided in said two-dimensional drawing circuit.

4. The image drawing apparatus according to claim 1, wherein said two-dimensional drawing circuit comprises an area setting circuit for setting drawing areas for specific figures, and selectively accesses either said frame buffer or said Z buffer, based on address of drawing area set in said area setting circuit.

5. The image drawing apparatus according to claim 4, wherein: said two-dimensional drawing circuit comprises: a bit number setting circuit for setting the number of bits per pixel; and a data setting circuit for setting data to be written into said specific figures; said two-dimensional drawing circuit stores a number of bits corresponding to said frame buffer in said bit number setting circuit and also stores color data in said data setting circuit, when drawing to said frame buffer; and said two-dimensional drawing circuit stores a number of bits corresponding to said Z buffer in said bit number setting circuit and also stores depth data in said data setting circuit, when making settings to said Z buffer.

6. The image drawing apparatus according to claim 1, wherein said two-dimensional drawing circuit draws two-dimensional straight lines.

7. The image drawing apparatus according to claim 1, wherein said two-dimensional drawing circuit fills in two-dimensional rectangular areas.

8. The image drawing apparatus according to claim 1, wherein said two-dimensional drawing circuit transfers two-dimensional rectangular areas to other positions.

9. The image drawing apparatus according to claim 1, wherein said three-dimensional straight line drawing circuit compares depth data at points on three-dimensional straight lines input against depth data stored beforehand in said Z buffer, selects data having smaller depth, and rewrites data to said frame buffer.

10. A three-dimensional image drawing apparatus comprising:

a frame buffer for storing display data corresponding to a display apparatus display screen;

a two-dimensional drawing circuit for performing coordinate operations in order to draw specific two-dimensional images to said frame buffer;

a Z buffer for storing depth data for performing three-dimensional drawing to said frame buffer, wherein said two-dimensional drawing circuit is used as a setting circuit for said Z buffer;

a three-dimensional straight line drawing circuit for performing three-dimensional drawing in said frame buffer based on said depth data stored in said Z buffer; and a memory control circuit for controlling access to the buffers; wherein:

areas of said frame buffer and Z buffer are established in same physical memory;

said physical memory comprises two frame buffers having same size and same number of bits per pixel; and said memory control circuit uses said frame buffers as a double buffer for animation, by alternately drawing to said two frame buffers.

* * * * *